(12) United States Patent
Hara et al.

(10) Patent No.: US 10,604,269 B2
(45) Date of Patent: Mar. 31, 2020

(54) STRUCTURE FOR ANTI-ADHESION OF HIGH-TEMPERATURE AIR TO AIRFRAME, AND AIRCRAFT

(71) Applicant: MITSUBISHI AIRCRAFT CORPORATION, Aichi (JP)

(72) Inventors: Nobuhide Hara, Tokyo (JP); Osamu Yamada, Aichi (JP)

(73) Assignee: MITSUBISHI AIRCRAFT CORPORATION, Aichi (JP)

(*) Notice: Subject to any disclaimer, the term of this patent is extended or adjusted under 35 U.S.C. 154(b) by 364 days.

(21) Appl. No.: 15/431,892

(22) Filed: Feb. 14, 2017

(65) Prior Publication Data

US 2017/0253343 A1    Sep. 7, 2017

(30) Foreign Application Priority Data

Mar. 3, 2016 (JP) ................... 2016-040837

(51) Int. Cl.
*B64D 13/06* (2006.01)
*B64D 33/04* (2006.01)
(Continued)

(52) U.S. Cl.
CPC ............. *B64D 33/04* (2013.01); *B64C 1/40* (2013.01); *B64D 13/06* (2013.01);
(Continued)

(58) Field of Classification Search
CPC ................. B64D 33/04; B64D 2033/045
See application file for complete search history.

(56) References Cited

U.S. PATENT DOCUMENTS 3,930,627 A * 1/1976 Miller .................... B64D 33/04
244/121
6,325,593 B1   12/2001 Darkins, Jr. et al.
(Continued)

FOREIGN PATENT DOCUMENTS

EP    0151918 A2    8/1985
JP    60-216022 A   10/1985
(Continued)

OTHER PUBLICATIONS

Office action for Japanese Application No. 2016-040837 dated Jan. 15, 2020 and the translation thereof.

*Primary Examiner* — Philip J Bonzell
*Assistant Examiner* — Tye William Abell
(74) *Attorney, Agent, or Firm* — Pearne & Gordon LLP (57) ABSTRACT

A structure for anti-adhesion of high-temperature air according to the present invention includes: a high-temperature air duct that is provided in an accessory of an aircraft and allows high-temperature air likely to be higher than a specified temperature to flow through the high-temperature air duct; an exhaust port that discharges a flow of the high-temperature air led through the high-temperature air duct, to an outside of the airframe; and a low-temperature air supplying part that supplies a flow of low-temperature air lower in temperature than the high-temperature air discharged to the outside of the airframe, to an airframe surface. The low-temperature air supplying part is configured to form an air layer made of a flow of low-temperature air between the high-temperature air that is bent toward the airframe surface in flight of the aircraft, and the an airframe surface.

21 Claims, 8 Drawing Sheets

(51) Int. Cl.
*B64C 1/40* (2006.01)
*B64C 1/00* (2006.01)

(52) U.S. Cl.
CPC .............. *B64C 2001/0072* (2013.01); *B64C 2001/0081* (2013.01); *B64D 2013/0603* (2013.01); *Y02T 50/44* (2013.01); *Y02T 50/46* (2013.01)

(56) References Cited

U.S. PATENT DOCUMENTS

| | | | |
|---|---|---|---|
| 9,669,936 B1* | 6/2017 | Fiterman | B64D 13/06 |
| 2005/0051668 A1* | 3/2005 | Atkey | B64D 13/06 |
| | | | 244/118.5 |
| 2011/0107777 A1* | 5/2011 | Atkey | B64D 13/06 |
| | | | 62/115 |
| 2012/0126061 A1 | 5/2012 | Mendes et al. | |
| 2015/0251766 A1* | 9/2015 | Atkey | B64D 13/08 |
| | | | 244/13 |
| 2016/0288912 A1* | 10/2016 | Richardson | B64D 13/00 |

FOREIGN PATENT DOCUMENTS

| | | |
|---|---|---|
| JP | 2001-227302 A | 8/2001 |
| JP | 2009-507179 A | 2/2009 |
| WO | 2008041964 A2 | 4/2008 |
| WO | 2009064288 A1 | 5/2009 |

\* cited by examiner

STRUCTURE FOR ANTI-ADHESION OF HIGH-TEMPERATURE AIR TO AIRFRAME, AND AIRCRAFT

BACKGROUND OF THE INVENTION

Field of the Invention

The present invention relates to a structure capable of anti-adhesion of high-temperature air discharged to an outside of an airframe, exhaust from an air conditioner of an aircraft for example, to an airframe surface due to an air stream during flight.

Description of the Related Art

An air conditioner installed in an aircraft is typically provided in a lower part of a fuselage and covered with a belly fairing. Exhaust from the air conditioner is led through an exhaust duct to an exhaust port provided in the belly fairing and discharged to an outside of an airframe from the exhaust port. From the exhaust port, for example, exhaust at a high temperature of exceeding 100° C. is discharged.

In JP2009-507179A, to deal with formation of a high-temperature spot due to exhaust from an engine of a rotary wing aircraft hitting an airframe surface, exhaust is discharged upward to be separated from an airframe surface.

When an aircraft is parking, exhaust discharged to an outside of an airframe from an exhaust duct of an air conditioner of the aircraft through an exhaust port is blown out in a direction away from an airframe surface. However, during flight, a channel of the exhaust is bent by an air stream occurring around the airframe to flow adhering to an airframe surface that is positioned rearward of the exhaust port. Then, the exhaust adhering to the airframe surface increases a temperature of the airframe surface.

In particular, in the case where a fiber reinforced plastic, which is lower than metals in heat resistance, is used as constituting members of the airframe surface, countermeasures against adhesion of high-temperature exhaust to the airframe surface are urgently necessary.

The present invention is directed to reduce a thermal influence of high temperature air discharged to the outside of the airframe including exhaust from an air conditioner, on an airframe.

SUMMARY OF THE INVENTION

A structure for anti-adhesion of high-temperature air to an airframe according to the present invention includes: a high-temperature air duct that is provided in an accessory of the aircraft and allows high-temperature air at a temperature likely to be higher than a specified temperature to flow through the high-temperature air duct; an exhaust port that discharges a flow of the high-temperature air that is led through the high-temperature air duct, to an outside of the airframe; and a low-temperature air supplying part that supplies a flow of low-temperature air lower in temperature than the high-temperature air discharged to the outside of the airframe, to an airframe surface being a surface of the airframe, wherein the low-temperature air supplying part is configured to form an air layer made of a flow of the low-temperature air between the high-temperature air that is bent toward the airframe surface in flight of the aircraft, and the airframe surface.

The specified temperature applies to a temperature specified as an allowable temperature of the airframe surface.

The low-temperature air applies to air existing in a space in which the accessory is disposed, outside air taken in from the outside of the airframe, or both of these. A temperature of the low-temperature air is sufficiently lower than a temperature of the high-temperature air that is likely to be higher than the specified temperature, for example, the allowable temperature of the airframe surface.

In the present invention, the front and the rear means the front and the rear in a direction of flight of the aircraft.

Examples of the accessory in the present invention can include a device such as an air conditioner for air conditioning the aircraft that includes an exhaust duct for discharging the high-temperature air.

The accessory in the present invention is installed in a lower part of a fuselage that is covered with a fairing. The fairing forms the airframe surface, and the exhaust port can be provided in the fairing.

A member forming the airframe surface in the present invention can be formed of, for example, a metallic material such as an aluminum alloy, or a fiber reinforced plastic containing a reinforcement fiber such as a glass fiber.

According to the present invention, even when a jet of the high-temperature air discharged to the outside of the airframe through the high-temperature air duct and the exhaust port is bent toward the airframe surface positioned rearward of the exhaust port by an air stream that occurs around the airframe during flight, the flow of the low-temperature air supplied to the airframe surface by the low-temperature air supplying part forms the air layer between the flow of the high-temperature air facing the airframe surface and the airframe surface. This air layer being interposed between the high-temperature air and the airframe surface makes it possible to avoid direct adhesion of the high-temperature air to the airframe surface. This suppresses a temperature rise of the airframe due to the high-temperature air discharged to the outside of the airframe, and it is thus possible to reduce a thermal influence on the airframe and to avoid deterioration in properties according to a material of the airframe (e.g., deterioration in strength or proof strength).

If the high-temperature air flowing through the high-temperature air duct and the exhaust port is intended to be cooled by the low-temperature air, it is conceivable to dispose a duct tube or the like around the high-temperature air duct and to cause the low-temperature air introduced between the duct tube and the high-temperature air duct to be discharged from the exhaust port. The duct tube has to be large having large dimensions in an axis direction and a radial direction so as to secure a tube length that allows heat exchange to be sufficiently performed between the high-temperature air flowing in the high-temperature air duct and the low-temperature air and to secure a channel cross-sectional area that allows the low-temperature air to be subjected to direct heat exchange with the high-temperature air flowing out from the high-temperature air duct to be sufficiently supplied.

However, in the present invention, the thermal influence on the airframe is reduced by forming the air layer made of the low-temperature air supplied to the airframe surface between the airframe surface and the high-temperature air without depending on direct or indirect heat exchange between the high-temperature air and the low-temperature air in the high-temperature air duct, the exhaust port, or the vicinity of these. Therefore, small piping capable of supplying the low-temperature air to the airframe surface so as to form the air layer suffices, and a long tube length or a large channel cross-sectional area is not necessary. Consequently, it is possible to suppress an increase in weight of the aircraft.

According to the above, it is possible to reduce a thermal influence of the high temperature air discharged to the outside of the airframe on the airframe while suppressing an increase in weight of the aircraft.

In the present invention, the low-temperature air supplying part preferably includes a first channel that discharges the low-temperature air to the outside of the airframe through the exhaust port.

By not working on the airframe a channel for supplying the low-temperature air to the airframe surface and using the exhaust port as the channel, it is possible to suppress the increase in weight of the aircraft.

In the present invention, an outer circumferential portion of the high-temperature air duct is preferably covered with an insulator that inhibits propagation of heat from an inside of the high-temperature air duct to an outside of the high-temperature air duct.

With such a configuration, the insulator suppresses a temperature rise of the low-temperature air due to heat of the high-temperature air flowing through the high-temperature air duct, which allows the air layer made of the low-temperature air to enhance an effect of reducing a thermal influence on the airframe.

In the present invention, the exhaust port is preferably shifted rearward of a central portion of an area in the exhaust port to which the high-temperature air duct is projected, and the first channel is preferably wide on a rear side in the exhaust port and narrow on a front side in the exhaust port.

With such a configuration, it is possible to secure a flow of the low-temperature air on the rear side that contributes formation of the air layer.

In the present invention, the low-temperature air supplying part preferably includes a cover that surrounds at least a part of an outer circumferential portion of the high-temperature air duct, and the first channel is preferably formed including a space between the cover and the high-temperature air duct and including the exhaust port.

The cover corresponds to the small piping capable of supplying the low-temperature air to the airframe surface so as to form the air layer.

In the present invention, the low-temperature air supplying part includes one or more second channels that penetrate a member forming the airframe surface, in an area of the airframe where the high-temperature air faces the airframe surface.

The second channels are formed in an area where the high-temperature air is bent toward the airframe surface positioned rearward of the exhaust port to face the airframe surface and thus the second channels are away from and rearward of the exhaust port for discharging the high-temperature air. Therefore, it is possible to supply the low-temperature air that hardly comes under an influence of heat of the high-temperature air to the airframe surface through the second channels so as to interpose the air layer between the flow of the high-temperature air and the airframe surface.

By disposing the second channels in the area where the high-temperature air faces the airframe surface, as appropriate, the air layer can be formed throughout the area. With such a configuration, it is possible to reduce a thermal influence of the high-temperature air on the airframe throughout the area.

The second channel is suitable for a drain channel for discharging oil leaking from hydraulic piping or the like to the outside of the airframe.

As the second channels, slits or aggregation of holes penetrating the airframe can be formed in the airframe.

In addition, the second channels can be formed including a channel that is formed within a range of a wall thickness of the member forming the airframe surface.

With such a configuration, the airframe is cooled by the low-temperature air flowing within the range of the wall thickness of the member, which can thereby contribute to reduction of a thermal influence on the member.

In the present invention, the low-temperature air supplying part preferably includes a third channel through which outside air taken in from the outside of the airframe flows, and the third channel preferably supplies the outside air to at least one of the aforementioned first channel and the second channels.

With such a configuration, the outside air at a temperature sufficiently lower than a temperature of the space in which the accessory is installed is supplied to the airframe surface as the low-temperature air during flight, and it is thus possible to reduce a thermal influence of the high-temperature air on the airframe surface furthermore.

An aircraft according to the present invention includes the aforementioned structure for anti-adhesion of high-temperature air.

According to the present invention, it is possible to reduce a thermal influence of high temperature air discharged to an outside of an aircraft, on an airframe.

DETAILED DESCRIPTION OF THE PREFERRED EMBODIMENTS

Hereinafter, embodiments of the present invention will be described with reference to the accompanying drawings.

[First Embodiment]

Figure 1:
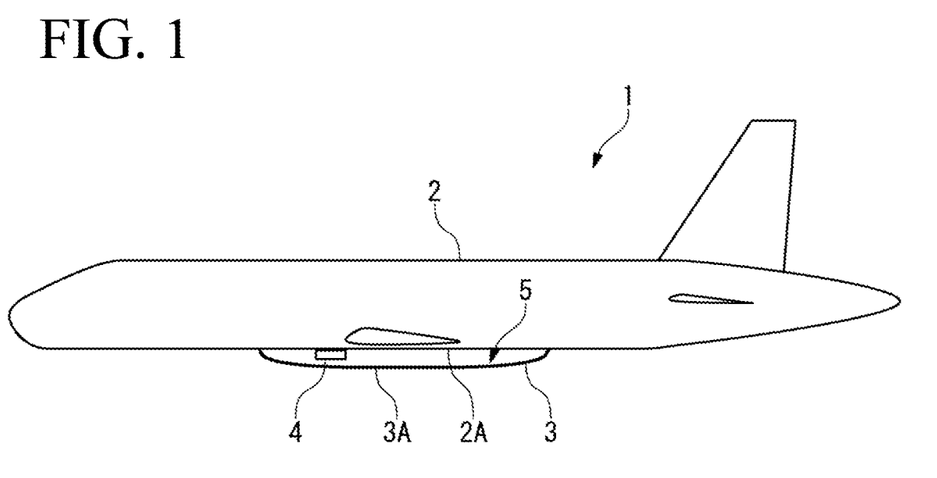
FIG. 1 is a schematic diagram illustrating an aircraft according to a first embodiment.

An aircraft 1 illustrated in FIG. 1 includes a fuselage 2 and a belly fairing 3 with which a lower part 2A of the fuselage 2 is covered.

The fuselage lower part 2A is provided with various accessories. One of the accessories is an air conditioner 4 that constitutes an air-conditioning system of the aircraft.

To secure redundancy, there are two air conditioners 4, one of which is provided on a left side of the fuselage lower part 2A, and another of which is provided on a right side of the fuselage lower part 2A.

The air-conditioning system supplies air obtained by the air conditioners 4 to a pressurized compartment through piping (not illustrated). After supplied for air conditioning, the air is discharged from the pressurized compartment into the fairing 3 through an air-pressure regulating valve (not illustrated) provided in the fuselage lower part 2A.

Therefore, an inside of the fairing 3 is higher than an outside of the fairing 3 (outside of the airframe) in pressure due to a pressure of the air for air-conditioning circulating in the aircraft.

With the fairing 3, accessories including the air conditioners 4 provided in the fuselage lower part 2A are covered. The fairing 3 can be formed of a fiber reinforced plastic, which contains a glass fiber, a carbon fiber, or the like as a reinforcement fiber, or formed of a metallic material such as an aluminum alloy.

For weight reduction, the fairing 3 in the present embodiment is formed of a fiber reinforced plastic containing a glass fiber (glass fiber reinforced plastics: GFRP).

The fairing 3 is formed in such a manner as to extend along the fuselage lower part 2A, leaving a volume necessary to dispose the accessories between itself and the fuselage lower part 2A.

Figure 2:
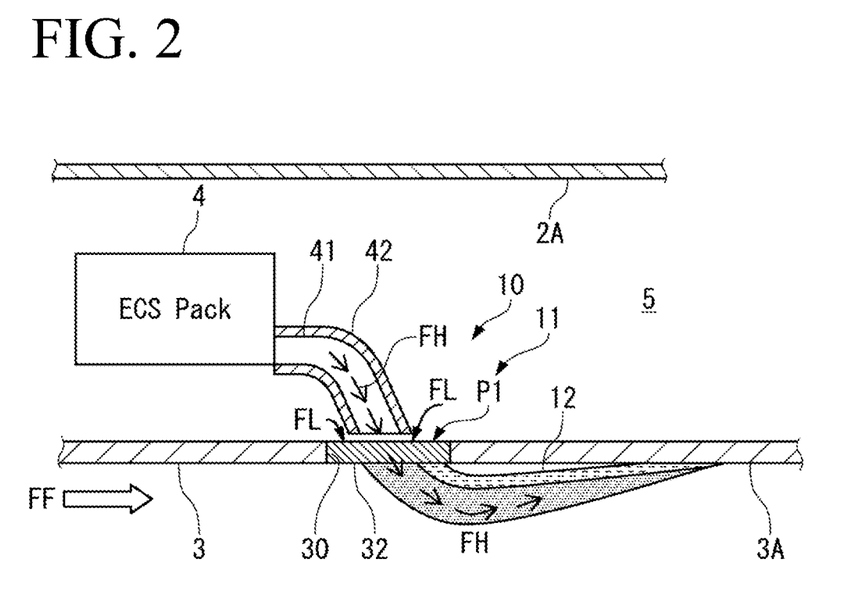
FIG. 2 is a cross-sectional view schematically illustrating a structure for anti-adhesion of high-temperature air according to the first embodiment.

As illustrated in FIG. 2, the air conditioners 4 are each provided with an exhaust duct 41 through which exhaust at high temperature (high-temperature air) flows. A temperature of the exhaust flowing through the exhaust duct 41 can be higher than an allowable temperature of a surface 3A of the fairing 3. FIG. 2 illustrates a flow FH of this exhaust (hereinafter, referred to as an exhaust stream) using arrows.

Although not illustrated, the air conditioners 4 each also include a duct for taking in outside air and a duct for introducing each bleed air from engines and auxiliary power units.

The exhaust from the air conditioner 4 is led through the exhaust duct 41 to an exhaust port 30 provided in the fairing 3 and blown to the outside of the airframe through the exhaust port 30. During flight of the aircraft 1, the course of the blown-out exhaust stream FH is bent by an air stream FF occurring around an airframe and thus flows adhering to the surface 3A (an outer surface) of the fairing 3 that is positioned rearward of the exhaust port 30.

In order to prevent the temperature of the fairing surface 3A from exceeding an allowable temperature due to heat of the exhaust stream FH, it is necessary to reduce a thermal influence of the exhaust stream FH on the fairing 3.

The aircraft 1 includes a structure 10 for anti-adhesion of high-temperature air that is capable of dealing with adhesion of the exhaust stream FH to the fairing surface 3A.

The structure 10 for anti-adhesion of high-temperature air includes the exhaust duct 41, the exhaust port 30, and a low-temperature air supplying part 11.

The low-temperature air supplying part 11 supplies, to the fairing surface 3A, a low-temperature air flow FL that is lower in temperature than the exhaust stream FH discharged to the outside of the airframe.

Thus, even when a jet of the exhaust stream FH discharged to the outside of the airframe is bent by the air stream FF, the low-temperature air flow FL supplied to the fairing surface 3A by the low-temperature air supplying part 11 forms an air layer 12 between a flow of the exhaust stream FH facing the fairing surface 3A and the fairing surface 3A.

Since the air layer 12 is interposed between the exhaust stream FH and the fairing surface 3A, a blast of the exhaust stream FH is not directly delivered to the fairing surface 3A, and it is thus possible to avoid a thermal influence on the fairing 3.

The low-temperature air supplying part 11 in the present embodiment supplies air inside the fairing 3, namely, existing in a space 5 between the fairing 3 and the fuselage lower part 2A, to the fairing surface 3A as low-temperature air. Under control of the air-conditioning system, a temperature of the air in the space 5 circulating in the aircraft is sufficiently lower than the temperature of the exhaust discharged to the outside of the airframe through the exhaust duct 41 and the exhaust port 30.

The low-temperature air supplying part 11 discharges air existing in the space 5 to the outside of the airframe through the exhaust port 30 and supplies the air to the fairing surface 3A. The low-temperature air supplying part 11 includes a channel P1 for discharging low-temperature air existing in the space 5 to the outside of the airframe.

To supply the low-temperature air to the fairing surface 3A through the channel P1, it is preferable to cover an outer circumferential portion of the exhaust duct 41 with an insulator 42.

The insulator 42 is formed by laminating an aramid fiber, a Teflon (Registered mark)-impregnated glass cloth, and an aluminum film, in this order from a side in contact with a surface of a structural material to be covered (the exhaust duct 41), and inhibits propagation of heat from an inside of the exhaust duct 41 to an outside of the exhaust duct 41.

Since the insulator 42 suppresses a temperature rise of the low-temperature air due to the heat of the exhaust stream FH flowing through the exhaust duct 41, which allows the air layer 12 made of the low-temperature air to enhance an effect of reducing the thermal influence on the fairing 3.

Figure 3A:
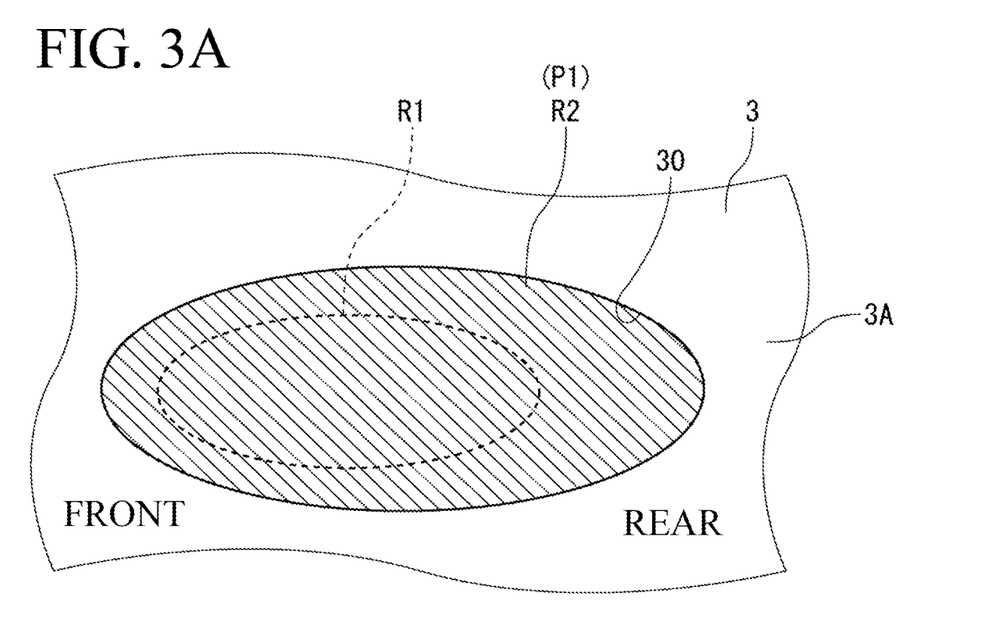
FIG. 3A is a plan view illustrating an exhaust port illustrated in FIG. 1.

The exhaust port 30 is an opening including a projected area R1 of an end portion of the exhaust duct 41, as illustrated in FIG. 3A. A crosscut of the exhaust duct 41 in the present embodiment has a round shape, and the projected area R1 is formed into an elliptical shape.

In an opening range of the exhaust port 30, an area R2 corresponds to the channel P1 through which the low-temperature air existing in the space 5 in the fairing 3 flows to the outside of the airframe, the area R2 being the opening range apart from the projected area R1.

The low-temperature air existing in the space 5 is discharged to the outside of the airframe through the channel P1 by a pressure difference between the space 5 and the outside of the airframe.

The exhaust port 30 may have any shape such as a rectangle, a round, and an ellipse. The exhaust port 30 in the present embodiment is elliptically formed.

As illustrated in FIG. 3A, it is preferable that the exhaust port 30 is shifted rearward of a central portion of the projected area R1, and the channel P1 is wide on a rear side in the exhaust port 30 and narrow on a front side in the exhaust port 30.

With such a configuration, it is possible to secure the low-temperature air flow FL that flows rearward of the exhaust port 30 to contribute to formation of the air layer 12. Meanwhile, it is also preferable that the exhaust port 30 is secured from the front side to lateral sides to some extent so as to allow the air layer 12 to be formed even when a direction of the air stream FF changes with respect to a longitudinal axis direction of the aircraft.

Figure 3B:
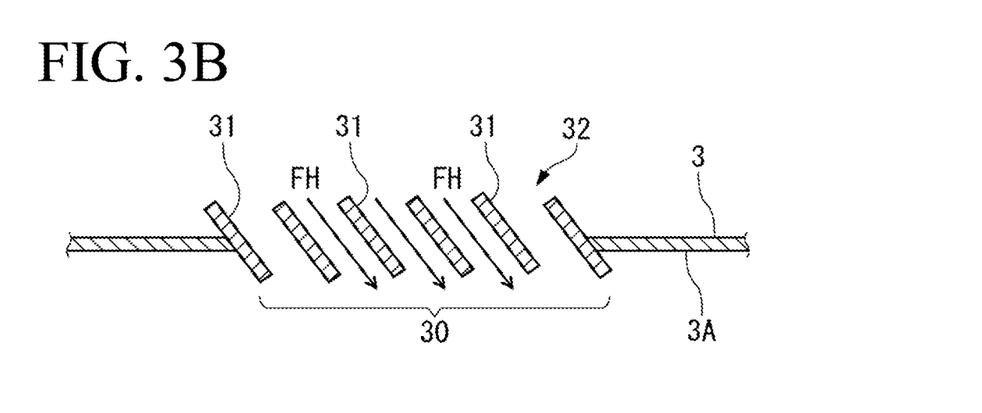
FIG. 3B is a cross-sectional view schematically illustrating a louver of the exhaust port.

The exhaust port 30 is provided with a louver 32 including a plurality of blade members 31 that incline with respect to a vertical direction, as illustrated in FIG. 3B. The exhaust stream FH is discharged to the outside of the airframe while being straightened up obliquely rearward by the louver 32.

The exhaust stream FH is discharged to the outside of the airframe and is blown out in the direction away from the fairing surface 3A by an exhaust pressure from the air conditioner 4, and thereafter the exhaust stream FH is bent by the air stream FF. In contrast, the low-temperature air flow FL is discharged by a pressure difference between the space 5 and the outside of the fairing 3, the outside pressure being lower than the exhaust pressure from the air conditioner 4. The low-temperature air flow FL flows rearward along the fairing surface 3A due to the air stream FF immediately after discharged to the outside of the fairing 3 (outside of the airframe).

With the above configuration, the low-temperature air flow FL is formed on an inner circumferential side of the exhaust stream FH bent by the air stream FF, and the flow FL forms the air layer 12.

The low-temperature air flow FL discharged to the outside of the airframe can be adjusted by dimensions (a cross-sectional area, etc.) of the channel P1 or a direction given to the flow FL by the louver 32.

In the present embodiment described above, the supply of the low-temperature air in the space 5 to the fairing surface 3A through the channel P1 by the low-temperature air supplying part 11 enables the air layer 12 to be interposed between the high-temperature exhaust stream FH bent by the air stream FF and the fairing surface 3A faced by the exhaust stream FH. Since this configuration suppresses a temperature rise of the fairing 3 due to the exhaust stream FH, the fairing 3 can be kept at the allowable temperature or lower, and it is thus possible to prevent the GFRP-made fairing 3 from decreasing in flexural strength.

In addition, since the area R2, which is other than the projected area R1 of the exhaust duct 41 in the exhaust port 30, is used as the channel P1 to supply the low-temperature air to the fairing surface 3A, the installation of the structure 10 for anti-adhesion of high-temperature air in the aircraft 1 does not increase a weight of the aircraft 1.

According to the present embodiment, by supplying the low-temperature air necessary for the formation of the air layer 12 to the fairing surface 3A through the channel P1, it is possible to reduce a thermal influence of the exhaust stream FH on the airframe while suppressing an increase in weight.

Furthermore, the low-temperature air flow FL flowing through the channel P1 is made available as thrust of the airframe.

[Modification of First Embodiment]

Figure 4:
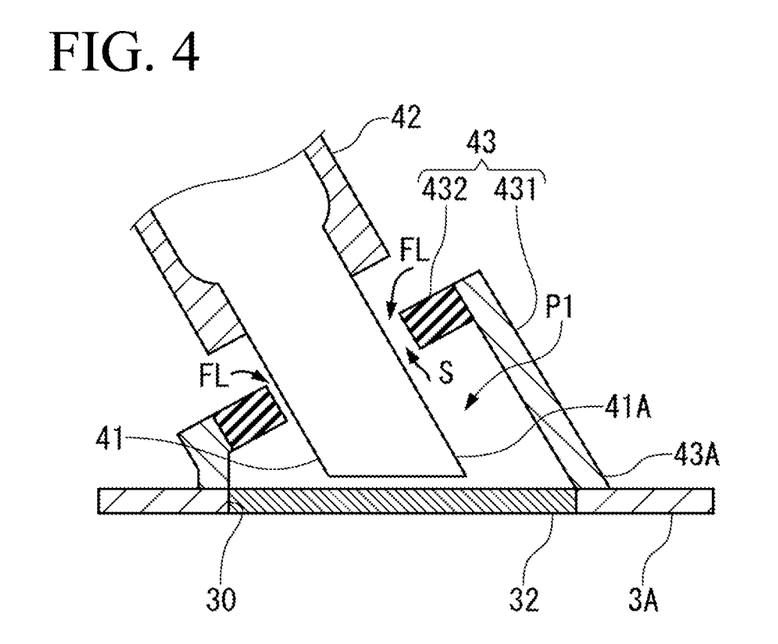
FIG. 4 is a cross-sectional view illustrating a low-temperature air supplying part according to a modification of the first embodiment.

The channel P1 for discharging the low-temperature air to the outside of the airframe through the exhaust port 30 may be formed between the exhaust duct 41 and the cover 43 surrounding an outer circumference of the exhaust duct 41, as illustrated in FIG. 4.

The cover 43 surrounds an end portion 41A of the exhaust duct 41 and an outer circumferential portion of the exhaust duct 41 at the vicinity of the end portion 41A. An end portion 43A of the cover 43 is connected to the exhaust port 30.

A space between the outer circumferential portion of the exhaust duct 41 and an inner circumferential portion of the cover 43, and the exhaust port 30 constitute the channel P1.

The cover 43 is for surrounding a part of the outer circumferential portion of the exhaust duct 41 so as to form the channel P1 through which the low-temperature air necessary for the formation of the air layer 12, between itself and the outer circumferential portion of the exhaust duct 41.

This cover 43 need not have a long tube length or a large channel cross-sectional area, and thus an increase in weight to provide the cover 43 can be minimized.

The cover 43 includes a cover body 431 through which exhaust flows and an elastic member 432. The elastic member 432 is a member for cushioning and interposed between the cover body 431 and the exhaust duct 41, and a predetermined gap S is set between the elastic member 432 and the outer circumferential portion of the exhaust duct 41.

Both of the cover body 431 and the elastic member 432 can be formed of a material that endures heat of exhaust propagating from the exhaust duct 41. Examples of the material of the cover body 431 can include a stainless steel.

In the example illustrated in FIG. 4, the outer circumferential portion of the exhaust duct 41 is covered with the insulator 42 upward of the cover 43. This configuration is not limited to this example, and the entire of the outer circumferential portion of the exhaust duct 41 may be covered with the insulator 42.

The low-temperature air in the space 5 flows into between the outer circumferential portion of the exhaust duct 41 and the cover body 431 through the gap S because the channel P1 surrounded by the cover 43 is at a negative pressure with respect to the flow FL, and the low-temperature air is discharged to the outside of the airframe from the exhaust port 30.

Appropriately setting dimensions of the gap S enables the low-temperature air, which is sufficient to form the air layer 12 that reduces the thermal influence on the fairing 3, to be introduced between the exhaust duct 41 and the cover 43 and discharged to the outside of the airframe.

The channel P1 is preferably opened/closed as necessary. To achieve this, for example, an opening/closing mechanism can be provided that opens/closes the aforementioned gap S in accordance with the temperature of the exhaust stream FH. The opening/closing mechanism enables the channel P1 to be opened only when the temperature of the exhaust stream FH is so high as to exceed the allowable temperature of the fairing surface 3A to which the exhaust stream FH adheres, and to be closed otherwise.

As such an opening/closing mechanism, for example, a bimetal may be employed, the bimetal being made by joining metallic members having different coefficients of linear expansion and behaving differently according to temperatures.

Figure 8:
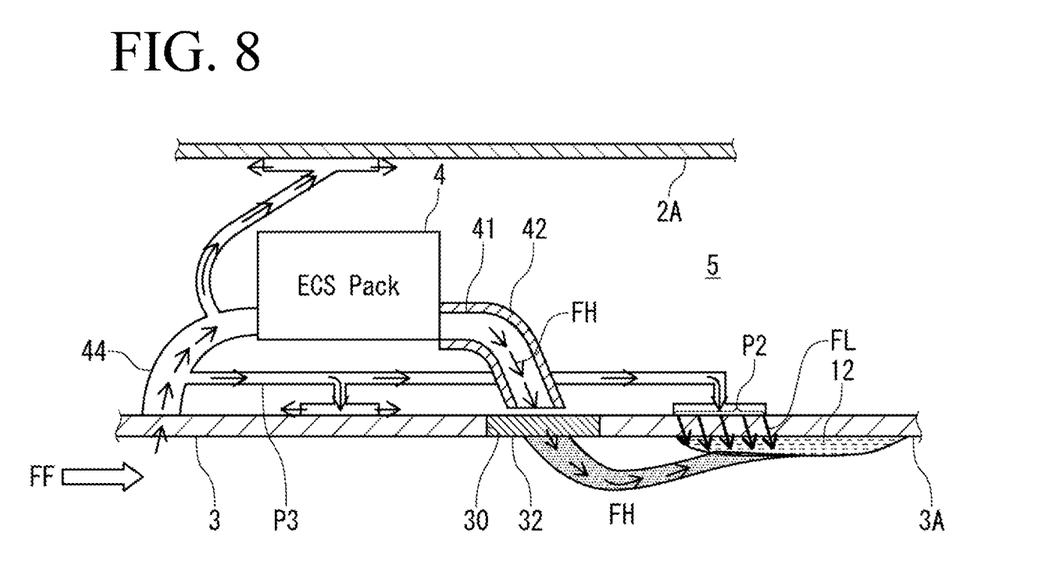
FIG. 8 is a cross-sectional view schematically illustrating a structure for anti-adhesion of high-temperature air according to a third embodiment.

Such an opening/closing mechanism is similarly applicable to a channel P2 in a second embodiment (FIG. 5) and a channel P3 in a third embodiment (FIG. 8).

[Second Embodiment]

Next, the second embodiment of the present invention will be described with reference to FIG. 5 and FIG. 6.

The description will be made below focusing on points different from those of the first embodiment. Configurations similar to those in the first embodiment are denoted by the same reference characters.

A structure for anti-adhesion of high-temperature air according to the second embodiment includes a low-temperature air supplying part 21 that includes a channel P2 penetrating the fairing 3.

The low-temperature air supplying part 21 supplies low-temperature air in the space 5 to the fairing surface 3A through the channel P2 mainly based on a pressure difference between the space 5 and the outside of the airframe.

If there is the risk that exhaust from the exhaust duct 41 causes an excessively large temperature rise of the fairing 3 in the vicinity of the exhaust port 30, it is preferable to suppress the temperature rise of the fairing 3 by discharging some low-temperature air from around the air exhaust duct 41 through the exhaust port 30.

The channel P2 is constituted by a plurality of through holes 3H (FIG. 6) that penetrate the fairing 3 in a thickness direction of the fairing 3, in an area 3R where the exhaust stream FH faces the fairing surface 3A, and in the vicinity of the area 3R. Axis lines of the through holes 3H preferably incline with respect to the thickness direction of the fairing 3, as with the blade members 31 of the louver 32 (FIG. 3B).

Figure 6:
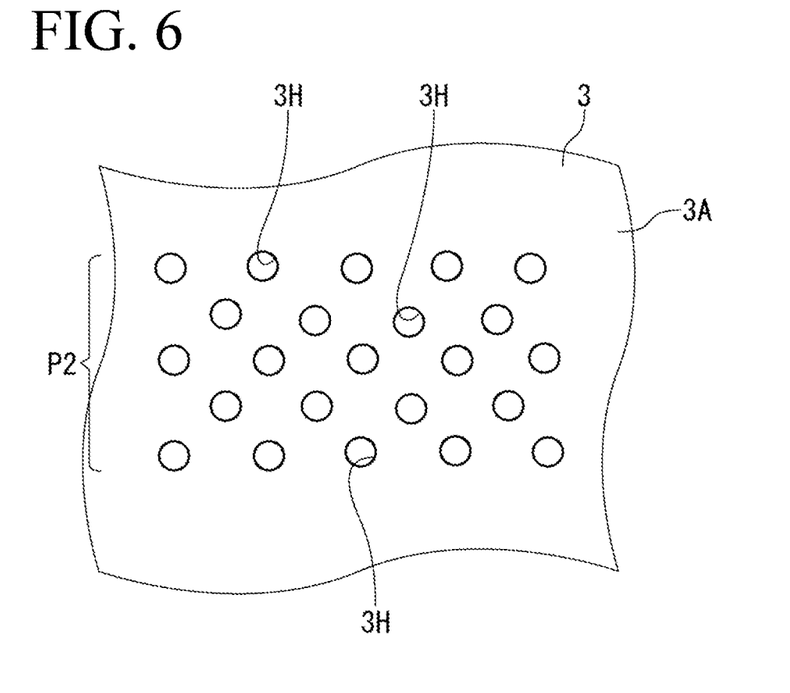
FIG. 6 is a plan view illustrating a low-temperature air supplying part illustrated in FIG. 5.

The through holes 3H are disposed substantially at regular intervals, as illustrated in FIG. 6.

A diameter of each of the through holes 3H is, for example, several millimeters.

In place of the aggregation of the through holes 3H, slits penetrating the fairing 3 in the thickness direction can be formed. For example, single or a plurality of slits can be formed that extend in a lateral direction perpendicular to a front-back direction in a plane of the fairing surface 3A.

Since the channel P2 is formed in the area 3R of the fairing 3 where the exhaust stream FH bent by the air stream FF faces the fairing surface 3A, and in the vicinity of the area 3R, the channel P2 is away from and rearward of the exhaust port 30 for discharging the exhaust stream FH to the outside of the airframe. Therefore, it is possible to supply cold low-temperature air that hardly comes under an influence of heat of the exhaust stream FH to the fairing surface 3A through the channel P2 so as to interpose the air layer 12 between a flow of the exhaust stream FH and the fairing surface 3A.

In addition, by appropriately disposing the through holes 3H in the area 3R and in the vicinity of the area 3R, it is possible to form the air layer 12 throughout the area 3R and to reduce a thermal influence of the exhaust stream FH on the fairing 3 throughout the area 3R.

Moreover, since the channel P2 is away from the exhaust duct 41 that generates intense heat, the channel P2 can be preferably used as a drain channel for discharging oil to the outside of the airframe, the oil leaking from hydraulic piping and the like arranged in the space 5 inside the fairing 3.

In such a case, in order to cause the oil leaking from the hydraulic piping to flow toward the channel P2, an inclination, a guide, or the like may be provided inside the fairing 3.

In addition, even such a weak flow FL flowing through the channel P2 is available as thrust of the airframe.

Positions for formation of the through holes 3H or the slits constituting the channel P2 does not necessarily coincide with the area 3R where the exhaust stream FH bent by the air stream FF faces the fairing surface 3A. In the present embodiment, some of the through holes 3H are disposed forward of the area 3R. Low-temperature air discharged to the outside of the airframe through the through holes 3H positioned forward of the area 3R flows into a space between the fairing surface 3A and the exhaust stream FH positioned rearward of the area 3R.

Considering to what degree the thermal influence of the exhaust stream FH exerting on the fairing 3, the through holes 3H or the slits can be formed in an appropriate range in the area 3R, and the through holes 3H or the slits can be formed up to a range beyond the area 3R.

The aforementioned first embodiment and the second embodiment can be combined together.

Figure 5:
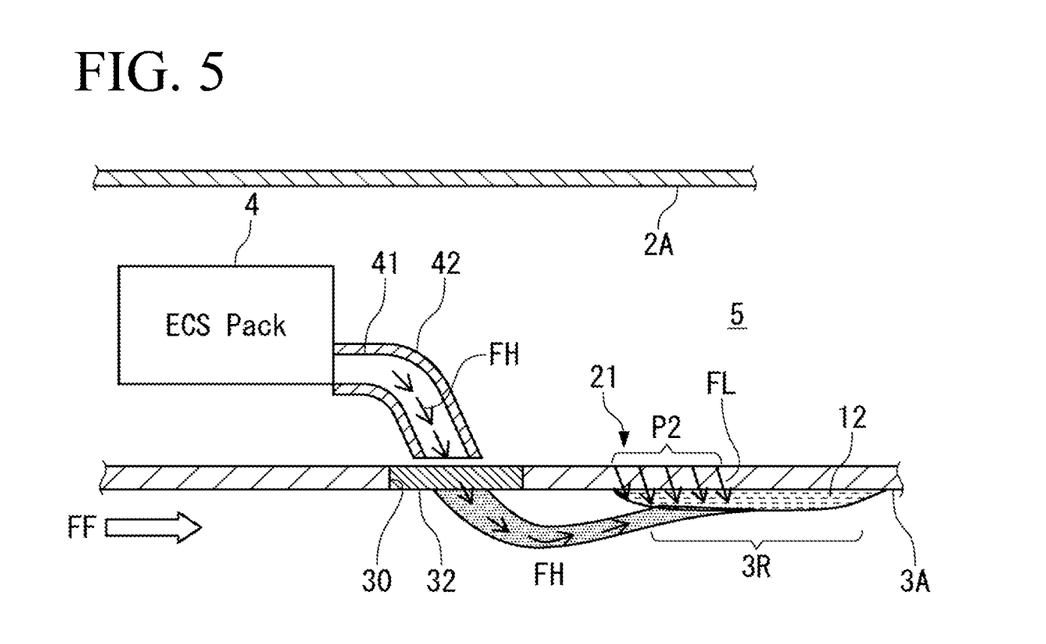
FIG. 5 is a cross-sectional view schematically illustrating a structure for anti-adhesion of high-temperature air according to a second embodiment.

In other words, the low-temperature air can be supplied to the fairing surface 3A through both of the channel P1 in the first embodiment (FIG. 2) and the channel P2 in the second embodiment (FIG. 5).

[Modification of Second Embodiment]

Figure 7:
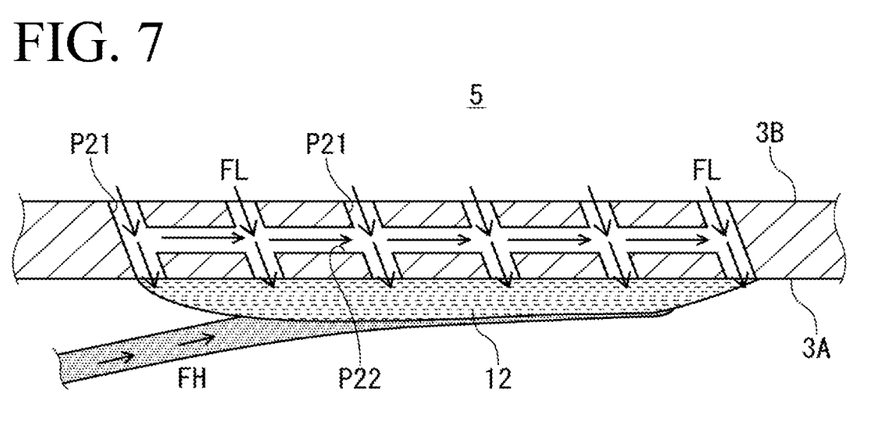
FIG. 7 is a cross-sectional view schematically illustrating a low-temperature air supplying part of a structure for anti-adhesion of high-temperature air according to a modification of the second embodiment.

The channel P2 may include a transversal channel P22 that extends along an in-plane direction of the fairing surface 3A within a range of a wall thickness of the fairing 3, as illustrated in FIG. 7.

The channel P2 illustrated in FIG. 7 includes a plurality of vertical channels P21 that penetrate the fairing 3 in the thickness direction, and the transversal channel P22 that is formed within the range of the wall thickness of the fairing 3 in such a manner as to connect the plurality of vertical channels P21 to each other.

If the fairing 3 is a honeycomb core sandwich panel formed of a GFRP, cells of the honeycomb core may be used as the vertical channels P21, and a plurality of holes opened in such a manner as to penetrate the cells in a direction along the panel may be used as the transversal channel P22.

Low-temperature air in the space 5 flows into the vertical channels P21 mainly by a pressure difference between the space 5 and the outside of the airframe and is discharged to the outside of the airframe from the vertical channels P21 while flowing also in the transversal channel P22. The low-temperature air in the space 5 flows in such a manner as to circulate around the inside of the plane of the fairing 3 through the vertical channels P21 and the transversal channel P22.

With the configuration illustrated in FIG. 7, it is possible to deal with a thermal factor from the outside of the airframe, namely the exhaust stream FH, by the air layer 12 formed of the low-temperature air supplied to the fairing surface 3A while cooling the fairing 3 from the inside thereof fairing 3 with use of the low-temperature air flowing within the range of the wall thickness of the fairing 3.

Here, the low-temperature air in the space 5 is kept at a low temperature by flowing of the air, whereas an inner surface 3B of the fairing 3 is prone to receive heat emitted from a housing or the exhaust duct 41 of the air conditioner 4 and to increase in temperature. Radiation from the inner surface 3B of the fairing 3 is also considerable as an influence on a temperature of the fairing outer surface 3A. For this reason, cooling the fairing 3 from its inside by the low-temperature air flowing through the channel P2 including the transversal channel P22 is effective also in dealing with the radiation from the inside of the fairing 3.

[Third Embodiment]

Next, the third embodiment of the present invention will be described with reference to FIG. 8.

A structure for anti-adhesion of high-temperature air according to the third embodiment includes, in addition to the channel P2 described in the second embodiment, a channel P3 through which outside air taken in from the outside of the airframe flows.

The channel P3 is connected to an outside air introducing duct 44 for taking the outside air into the air conditioner 4, and the outside air flowing through the outside air introducing duct 44 partially flows into the channel P3. The channel P3 extends rearward of the exhaust port 30 and supplies the outside air to the channel P2.

The configuration may be made so as to cause outside air that is taken in apart from the outside air to be introduced into air conditioner 4 flow into the channel P3.

During flight, outside air at a temperature sufficiently lower than a temperature of the space 5 is supplied to the fairing surface 3A through the channel P3 and the channel P2 as the low-temperature air, and it is thus possible to reduce a thermal influence of high-temperature air on the fairing 3 furthermore.

In place of the channel P2, the outside air can be supplied from the channel P3 to the channel P1 described in the first embodiment. In addition, the outside air can be supplied from the channel P3 to both of the channel P1 and the channel P2.

Now, members positioned around the air conditioner 4 such as the inner surface 3B of the fairing 3 and a surface of the fuselage lower part 2A are prone to be at high temperature by heat emitted from the housing or the exhaust duct 41 of the air conditioner 4. For this reason, it is preferable to cool these members by supplying the outside air through the channel P3 to high-temperature areas on the inner surface 3B of the fairing 3 and the surface of the fuselage lower part 2A.

Besides the above, the configuration described in the above embodiment may be selected or changed to the other configurations as appropriate, without departing from the gist and scope of the present invention.

The high-temperature air of which the adhesion to the airframe surface needs to be dealt with in the present invention is not limited to high-temperature air that passes the exhaust duct 41 of the air conditioner 4 to be discharged to the outside of the airframe, and may be high-temperature air that passes a duct provided in another accessory of the aircraft to be discharged to the outside of the airframe. The airframe surface to which the high-temperature air adheres is not limited to the outer surface 3A of the belly fairing, and may be a surface of an appropriate member to be exposed to the flow FH.

What is claimed is:

1. A structure for anti-adhesion of high-temperature air to an airframe, comprising:
    a high-temperature air duct that is provided in an accessory of an aircraft and allows high-temperature air at a temperature likely to be higher than a specified temperature to flow through the high-temperature air duct;
    an exhaust port that discharges a flow of the high-temperature air that is led through the high-temperature air duct, to an outside of the airframe; and
    a low-temperature air supplying part that supplies a flow of low-temperature air lower in temperature than the high-temperature air discharged to the outside of the airframe, to an airframe surface being a surface of the airframe, wherein
    the low-temperature air supplying part is configured to form an air layer made of a flow of the low-temperature air between the high-temperature air that is bent toward the airframe surface in flight of the aircraft, and the airframe surface,
    wherein the high-temperature air duct is configured to extend between a first end and a second end, the first end being located on one end of the accessory, and the second end being located near the surface of the airframe; and
    a projected area of the second end of the high-temperature air duct in the exhaust port is smaller than an area of the exhaust port.

2. The structure for anti-adhesion of high-temperature air to an airframe according to claim 1, wherein the low-temperature air supplying part includes a second channel that penetrates a member forming the airframe surface, in an area of the airframe where the high-temperature air faces the airframe surface.

3. The structure for anti-adhesion of high-temperature air to an airframe according to claim 1, wherein the low-temperature air supplying part includes a third channel through which outside air taken in from the outside of the airframe flows, and
    the third channel is connected to at least one of a first channel that discharges the low-temperature air to the outside of the airframe through the exhaust port and a second channel that penetrates a member forming the airframe surface, in an area of the airframe where the high-temperature air faces the airframe surface.

4. The structure for anti-adhesion of high-temperature air to an airframe according to claim 1, wherein the accessory is an air conditioner that air-conditions an inside of the aircraft.

5. The structure for anti-adhesion of high-temperature air to an airframe according to claim 1, wherein
    the accessory is installed in a lower part of a fuselage that is covered with a fairing forming the airframe surface, and
    the exhaust port is provided in the fairing.

6. The structure for anti-adhesion of high-temperature air to an airframe according to claim 1, wherein
    he high-temperature air exceeds 100° C.

7. The structure for anti-adhesion of high-temperature air to an airframe according to claim 1, wherein
    the exhaust port is provided in a belly fairing that forms the airframe surface.

8. The structure for anti-adhesion of high-temperature air to an airframe according to claim 7, wherein
    the belly fairing is formed of a fiber reinforced plastic.

9. The structure for anti-adhesion of high-temperature air to an airframe according to claim 1, wherein the low-temperature air supplying part includes a first channel that discharges the low-temperature air to the outside of the airframe through the exhaust port, wherein the first channel is formed by an area which is an opening range of the exhaust port except the projected area.

10. The structure for anti-adhesion of high-temperature air to an airframe according to claim 9, wherein the accessory is an air conditioner that air-conditions an inside of the aircraft.

11. The structure for anti-adhesion of high-temperature air to an airframe according to claim 10, wherein
    the accessory is installed in a lower part of a fuselage that is covered with a fairing forming the airframe surface, and
    the exhaust port is provided in the fairing.

12. The structure for anti-adhesion of high-temperature air to an airframe according to claim 9, wherein the low-temperature air supplying part includes a second channel that penetrates a member forming the airframe surface, in an area of the airframe where the high-temperature air faces the airframe surface.

13. The structure for anti-adhesion of high-temperature air to an airframe according to claim 12, wherein the second channel is formed including a channel that is formed within a range of a wall thickness of the member forming the airframe surface.

14. The structure for anti-adhesion of high-temperature air to an airframe according to claim 9, wherein
    the exhaust port is shifted rearward of a central portion of the projected area of the second end of the high-temperature air duct in the exhaust port, and
    the first channel is wide on a rear side in the exhaust port and narrow on a front side in the exhaust port.

15. The structure for anti-adhesion of high-temperature air to an airframe according to claim 9, wherein
the low-temperature air supplying part includes a cover that surrounds at least a part of an outer circumferential portion of the high-temperature air duct, and
the first channel is formed including a space between the cover and the high-temperature air duct and including the exhaust port.

16. The structure for anti-adhesion of high-temperature air to an airframe according to claim 15, wherein
the first channel includes the space between an inside of the cover and the outer circumferential portion of the high-temperature air duct and includes the exhaust port.

17. The structure for anti-adhesion of high-temperature air to an airframe according to claim 9, wherein an outer circumferential portion of the high-temperature air duct is covered with an insulator that inhibits propagation of heat from an inside of the high-temperature air duct to low-temperature air existing in an outside of the high-temperature air duct.

18. The structure for anti-adhesion of high-temperature air to an airframe according to claim 17, wherein
the exhaust port is shifted rearward of a central portion of the projected area of the second end of the high-temperature air duct in the exhaust port, and
the first channel is wide on a rear side in the exhaust port and narrow on a front side in the exhaust port.

19. The structure for anti-adhesion of high-temperature air to an airframe according to claim 17, wherein
the low-temperature air supplying part includes a cover that surrounds at least a part of an outer circumferential portion of the high-temperature air duct, and
the first channel is formed including a space between the cover and the high-temperature air duct and including the exhaust port.

20. An aircraft comprising the structure for anti-adhesion of high-temperature air according to claim 1.

21. An aircraft comprising the structure for anti-adhesion of high-temperature air according to claim 11.

* * * * *

UNITED STATES PATENT AND TRADEMARK OFFICE
CERTIFICATE OF CORRECTION

PATENT NO. : 10,604,269 B2
APPLICATION NO. : 15/431892
DATED : March 31, 2020
INVENTOR(S) : Nobuhide Hara and Osamu Yamada

Page 1 of 1

It is certified that error appears in the above-identified patent and that said Letters Patent is hereby corrected as shown below:

In the Claims

Column 12, Line 22, Claim 6, "he" should read --the--.

Signed and Sealed this
First Day of September, 2020

Andrei Iancu
*Director of the United States Patent and Trademark Office*